United States Patent [19]
Zander

[11] Patent Number: 5,842,048
[45] Date of Patent: Nov. 24, 1998

[54] ADVANCING SHEATH FILM LOADER, METHOD OF FILM LOADING AND CAMERA FRAME ASSEMBLY

[75] Inventor: Dennis R. Zander, Penfield, N.Y.

[73] Assignee: Eastman Kodak Company, Rochester, N.Y.

[21] Appl. No.: 881,169

[22] Filed: Jun. 24, 1997

[51] Int. Cl.[6] .................................................. G03B 17/02
[52] U.S. Cl. .............................. 396/6; 396/538; 242/358; 242/535.1
[58] Field of Search ................................ 396/6, 535, 538; 242/358, 358.1, 535.1

[56] References Cited

U.S. PATENT DOCUMENTS

| | | |
|---|---|---|
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 4,440,483 | 4/1984 | Linke et al. . |
| 4,903,041 | 2/1990 | Light . |
| 5,125,630 | 6/1992 | Hoyt et al. . |
| 5,126,193 | 6/1992 | Light . |
| 5,746,388 | 5/1998 | Raimondi, Jr. ................... 242/535.1 X |

FOREIGN PATENT DOCUMENTS

7-5526  1/1995  Japan .

*Primary Examiner*—Howard B. Blankenship
*Attorney, Agent, or Firm*—Robert Luke Walker

[57] ABSTRACT

Advancing sheath film loader, method of film loading, and camera frame assembly. In the method a photographic filmstrip is loaded in a film supply. A sheath is advanced into the film supply. The sheath defines a substantially cylindrical scroll space within the film supply. During the advancing, the filmstrip is propelled into the scroll space to form a scroll. During the propelling, the sheath is tensioned against the scroll. The sheath can be disposed substantially in the film supply prior to film loading. If so, the sheath is partially extracted and then is returned to the film supply in coordination with the propelling of the filmstrip into the film supply.

23 Claims, 9 Drawing Sheets

ADVANCING SHEATH FILM LOADER, METHOD OF FILM LOADING AND CAMERA FRAME ASSEMBLY

FIELD OF THE INVENTION

The invention relates to photographic equipment and methods and more particularly relates to an advancing sheath film loader, method of film loading and a camera frame assembly.

BACKGROUND OF THE INVENTION

A wide variety of cameras, film cassettes, bulk film containers and the like store a long, relatively narrow filmstrip as a cylindrical film roll. (The terms "film" and "filmstrip" are used herein to refer to the same physical article. "Film" is used as the more general term. "Filmstrip" is used where it is desired to emphasize that the film, when unrolled, has the form of a long, narrow rectangle. The term "film supply" is used to refer to the camera, cassette, or container that holds the filmstrip. The roll of film is, in many cases, wound around a central spool or core. In other cases, the core is deleted in an effort to reduce expense, complexity, and weight and the film is in the form of a coreless roll or "scroll".

Scrolls can be formed by simply transporting a filmstrip into a cylindrical or similarly shaped storage container or camera film chamber. For example, a variety of cameras are known in which a film scroll is formed by prewinding unexposed film from a cartridge or spool. U.S. Pat. No. 1,921,559 and U.S. Pat. No. 1,921,560 teach thrust cartridge cameras which prewind to an empty scroll chamber having generally concave walls. This approach has the advantage that handling of the scroll is minimized, since the scroll is formed in situ. This approach has the problem that it tends to require the use of a filmstrip having specific curling properties and becomes problematic when the length of the filmstrip is increased.

A solution to this problem is using an appliance to help shape the scroll as it is formed. Scroll forming methods using appliances can be roughly categorized into methods using appliances acting external to the scroll, methods using appliances acting internal to the scroll, and methods using a combination of internal and external appliances. External-acting appliances have the advantage that the film does not need to be attached to the appliance during film scrolling. The following references teach methods and apparatus in which an external-acting appliance is used.

U.S. Pat. No. 3,057,573 teaches a camera having scroll chamber defined by three opposed rollers, which resiliently move apart as the scroll diameter is increased. One of the rollers is fixed. The other two are mounted in a movable carrier. U.S. Pat. No. 4,440,483 teaches a camera having a scroll chamber defined by curved walls and an arcuate lever. The lever is spring biased to bear against a film scroll within the chamber. U.S. Pat. No. 3,288,389 teaches the formation of a scroll in a film cartridge within a resilient band of rubber of the like. The band may be lined by foil or other flexible material. U.S. Pat. No. 2,484,248 teaches a similar cartridge having a metal spring. In each of these approaches, the film scroll is subject to the compressive force of the springs or resilient band during film use. This compressive force is undesirable, since it puts the scrolled filmstrip at risk of scratching.

It would thus be desirable to provide a film loader, loading method and film housing, in which the compressive force applied against a forming film scroll could be maintained or reduced as the scroll is formed.

SUMMARY OF THE INVENTION

The invention is defined by the claims. The invention, in its broader aspects, provides an advancing sheath film loader, method of film loading, and camera frame assembly. In the method a photographic filmstrip is loaded in a film supply. A sheath is advanced into the film supply. The sheath defines a substantially cylindrical scroll space within the film supply. During the advancing, the filmstrip is propelled into the scroll space to form a scroll. During the propelling, the sheath is tensioned against the scroll. The sheath can be disposed substantially in the film supply prior to film loading. If so, the sheath is partially extracted and then is returned to the film supply in coordination with the propelling of the filmstrip into the film supply.

It is an advantageous effect of at least some of the embodiments of the invention that a film loader, loading method and film housing are provided, in which the compressive force applied against a forming film scroll can be maintained or reduced as the scroll is formed.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the invention, a method and advancing sheath film loader are provided for loading a photographic filmstrip in a supply chamber, as a coreless film scroll within a flexible sheath. During scroll formation, the sheath is advanced into the film supply and the filmstrip is propelled from a film source into a scroll space defined by the sheath. During the advancing and propelling, a constant or decreasing compressive force is applied by the sheath against the forming film scroll. At the end of scroll formation, a minimal compressive force is applied against the final film scroll. This reduces the risk of film scuffing during subsequent transport of the film. The film supply can be the supply chamber of a camera or a film container or a cassette or other article for storing photographic film. The film source can be a bulk roll or a shorter film roll or a film cartridge. The invention is particularly useful in relation to cameras and is generally discussed below in terms of prewinding a filmstrip from a cartridge into the supply chamber of the camera frame assembly of the invention. It will be understood, however, that the invention is not limited to the embodiments discussed and that considerations similar to those discussed herein are applicable to other embodiments. The term "camera frame assembly" is used here to refer to a complete camera or an incomplete subunit of a camera that will later be assembled with other parts to form a complete camera.

Referring now to FIGS. 1–5, the advancing sheath film loader 10 prewinds a filmstrip 12, in a darkroom, into a scroll 100 in a camera frame assembly 14. The camera frame assembly 14 includes a camera frame 16 having a cartridge chamber 18 and a supply chamber 20. The camera frame 16 has an intermediate section or exposure frame 22 between the chambers 18,20. The cartridge and supply chambers 18,20 each have a rearwardly facing throat or opening 15,17, respectively. The supply chamber 20 can have end openings (not shown) or continuous end walls 21. A flexible sheath 26 is present in the supply chamber 20.

A film cartridge 30 is loaded into the frame assembly 14. The cartridge 30 includes a canister 32, a spool 34, and the filmstrip 12. The filmstrip 12 has a leading portion 38 having a free end 40, a tail portion or trailing portion 42, which is attached to the spool 34 in the canister 32, and a main portion 44 between the leading and tail portions 38,42. Prior to film loading, the main and trailing portions 44,42 of the filmstrip 12 are wound around the spool 34 in the canister 32. For thrust cartridges 30, the leading portion 38 is also wound around the spool 34.

The supply chamber 20 has a sidewall 24 that defines a supply space 19. The configuration of the supply space 19 is not important to the invention, with the exception that the supply space 19 is preferably at least as large as the space the film scroll 100 and sheath 26 would assume if constrained only at the ends 46,48 of the sheath 26. The frame assembly 14 lacks a film spool 34 or other axial film support, thus the films space 27 is empty, and remains empty after loading, except for the film scroll 100 and sheath 26.

The supply chamber 20 has a medial or first projection 50 and an opposed distal or second projection 52. The projections 50,52 face each other and define the throat 17 of the supply chamber 20. The separation of the projections 50,52 is less than the diameter of the final film scroll 100 and the diameter of the final scroll space 102 occupied by the final film scroll 100 after film loading. In the embodiments of the invention shown in the figures, the distal projection 52 is divided, in a direction parallel to the axis 51 of the cartridge spool 34, into two sub-projections 52a,52b. The sub-projections 52a,52b are separated by a slot 54. The frame assembly 14 defines a rear opening or rear accessway (indicated by dashed line 28 in FIG. 2) over the supply chamber 20 and, preferably over both chambers 18,20 and the intermediate section 22. In a particular embodiment of the invention, the supply chamber 20, including the opposed end walls 21, and projections 52a,52b is a unitary plastic casting.

The sheath 26 is elongate and has opposed first and second end 46,48 and a main section 56 between and, preferably, continuous with the ends 46,48. The main section 56 is curved in a cylindrical arc and is preferably unconstrained by the interior wall 24 of the supply chamber 20. The main section 56 defines and curves most of the way around the scroll space 102. The first and second end 46,48 are connected to respective first and second projections 50,52 and each adjoin the throat 17, which is substantially tangent to the scroll space 102. The first end 46 can be fixed to the first projection 50 by adhesive or the like, or can be removably attached to the first projection 50. It is preferred that the second end 48 is removably attached to the second projection 52. This allows the sheath 26 to be replaced at each reloading of a recycled camera, or to be inspected and reused unless damaged. Alternatively, it is not preferred; but the second end 48 can be detached from the second projection 52 in an unloaded camera frame assembly 14 and can be permanently attached to the second projection 52 in a film loaded camera frame assembly 14.

The second end 48 or both first and second ends 46,48 can be attached to the respective projections 50,52 in a variety of ways; for example, by use of mechanical fastening such as miniature hook and loop materials, or chemically by use of releasable adhesive. A convenient manner of attachment is hooking the sheath ends 46,48 onto respective projections 50,52. One member of a sheath end-projection pair is configured as a hook while the other member is configured as a hook receiver.

In the embodiments shown in the figures, each end 46,48 of the sheath 26 is crimped across the full width of the sheath 26 into a hook or trough shape. The first end 46 is recurved through roughly 180 degrees. The first projection 50 is complementary in shape. The bell 57 of the hook, that is, the most highly curved portion of the first end 46 is uppermost. The camera frame 16 includes a neighboring portion that adjoins the first projection 50 so as to define a channel 55 that receives the recurved portion of the first end 46. This separates the edge of the first end 46 of sheath 26 from the filmstrip 12 during loading and ensures that any contact of the filmstrip 12 with the first end 46 is over a small area of curved surface. The second end 48 is bent through roughly 45 degrees, into a V-shape. The second projection 52 is complementary in shape and the second end 48 fits on the second projection 52 such that the edge 59 of the second end 48 is uppermost. The lower leg 61 of the hook of the second end 48 is in alignment with the bell 57 of the hook of the first end 46, in a direction parallel to a plane through the axis of the spool 34.

The main section 56 of the sheath 26 is flexible and resilient and, in a relaxed condition is flat or slightly curved. When the main section 56 is in the supply chamber 20 and the ends 46,48 are attached to the projections 50,52, the main section 56 is flexed into a smooth arcuate curve. Defined and partially encircled by the main section 56 is the substantially cylindrical scroll space or film space 102. The sheath 26 is stiffer, that is, less flexible than the filmstrip 12 to be scrolled within the sheath 26. It has been determined that a sheath 26 that is more flexible than this cannot be effectively loaded with a filmstrip 12 by the method of the invention. The sheath 26 must also be sufficiently flexible to allow the sheath 26 to be slowly advanced into the supply chamber 20 during scrolling.

Figure 1A:
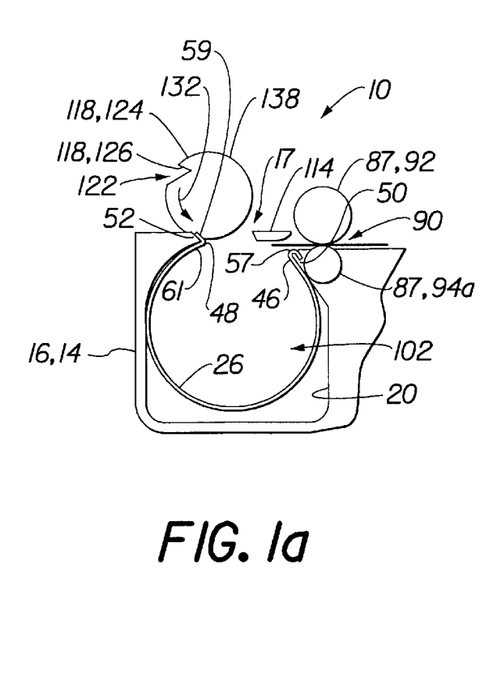
FIGS. 1a–1f are semi-diagrammatical partial views of an embodiment of the advancing sheath film loader and an embodiment of the camera frame assembly of the invention at different stages in the method of the invention.
Figure 1B:
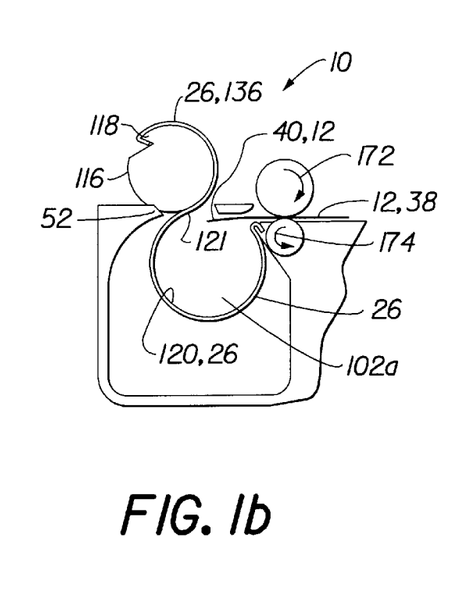
Figure 1C:
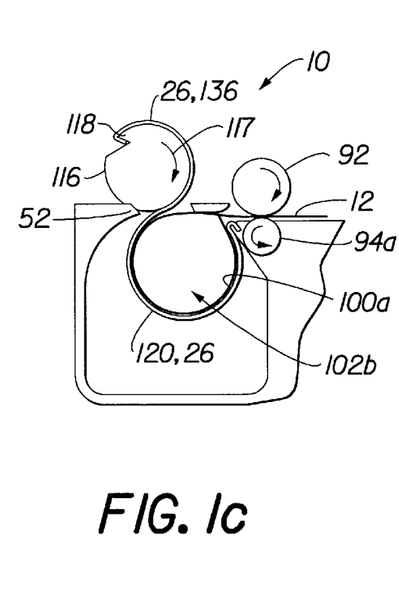
Figure 1D:
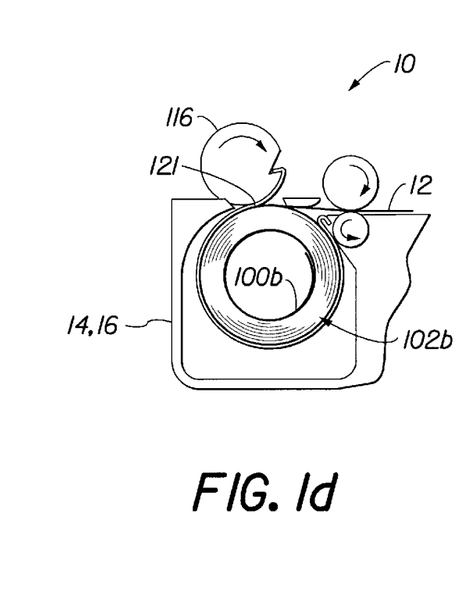
Figure 1E:
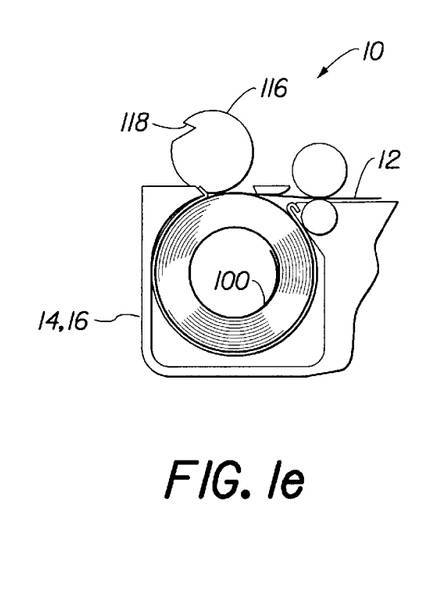
Figure 1F:
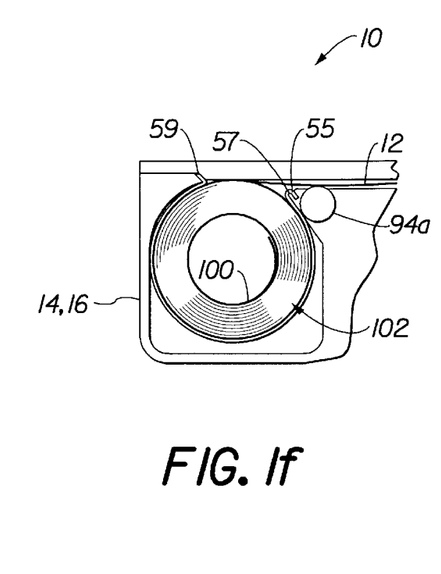

In the embodiment shown in FIGS. 1a–1f, the sheath 26 is capable of resiliently flexing, between a sinusoidal configuration and an arcuate configuration. In the sinusoidal configuration, the main section 56 of the sheath 26 has the cross-sectional shape of a smooth sinusoidal curve between the ends 46,48 (as shown in FIGS. 1b–1d). In the arcuate configuration, the main section 56 has the cross-sectional shape of a smooth arcuate curve between the ends 46,48 (as shown in FIGS. 1a, 1e, and 1f). Similarly, in the embodiment shown in FIGS. 9a–9f, the sheath is capable of resiliently flexing, between a hook-shaped configuration and an arcuate configuration.

The sheath 26 is made of a sheet material such as plastic and, in currently preferred embodiments, has a thickness in the range of about 1 mil (about $2.5 \times 10^{-2}$ mm to about 7 mils (about $18 \times 10^{-2}$ mm). In this embodiment, the sheath 26 has an elastic modulus greater than the elastic modulus of the filmstrip 12. Both the thickness and the material used for the sheath 26 can be modified to vary the resiliency of the sheath 26 for scrolling filmstrips of different stiffnesses. It is preferred the sheath 26 has a relatively low coefficient of friction, for example, less than about 0.3. This makes it easier for the free end 40 of the filmstrip 12 to coil within the sheath 26 and reduces the risk of scratching the filmstrip 12 during winding of the scroll.

The camera frame assembly 14 can also include other camera components which have been previously installed on the camera frame 16. For example, the camera frame assembly 14 can include an exposure system 58, including one or more sub-components such as a baffle, a lens system, and a shutter. The frame assembly 14 can include a camera film drive having a film engagement member (indicated diagrammatically in FIG. 2 by a semicircle 60) which adjoins the intermediate section 22 and engages film perforations (not shown) for film metering or both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section 22. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method of the invention, in different embodiments, can accommodate either type of film transport mechanism.

The apparatus 10 of the invention includes a receiver 62, and active components 64 for cartridge loading, film transporting, and film scrolling. The receiver 62 supports the camera frame assembly 14 or other film supply in a predetermined loading position 14a or series of positions 14a relative to the active components 64. The receiver 62 has a predetermined relationship to other components 64 and thus, during assembly, defines a predetermined relative location or site for each of the chambers 18,20, throats 15,17, intermediate section 22, and rear opening 28. (Sites correspond to features of the frame assembly 14 and are necessarily predetermined for a particular frame assembly 14 by adjusting physical constraints such as relative positions of the receiver 62 and other components 64 of the apparatus 10.) The receiver 62 can accept the camera frame assembly 14 directly or can be adapted to accept a pallet or nest 66 or the like. In that case, the camera frame assembly 14 is held in a predetermined relation to the pallet 66, which in turn in held in a predetermined loading orientation by the receiver 62. Indexing features 68 can be provided on the pallet 66 to permit the camera frame assembly 14 and the receiver 62 to be readily aligned. The frame assembly 14 can be provided to the receiver 62 premounted on a pallet 66 or the pallet 66 and frame assembly 14 can combined on the receiver 62.

Figure 5:
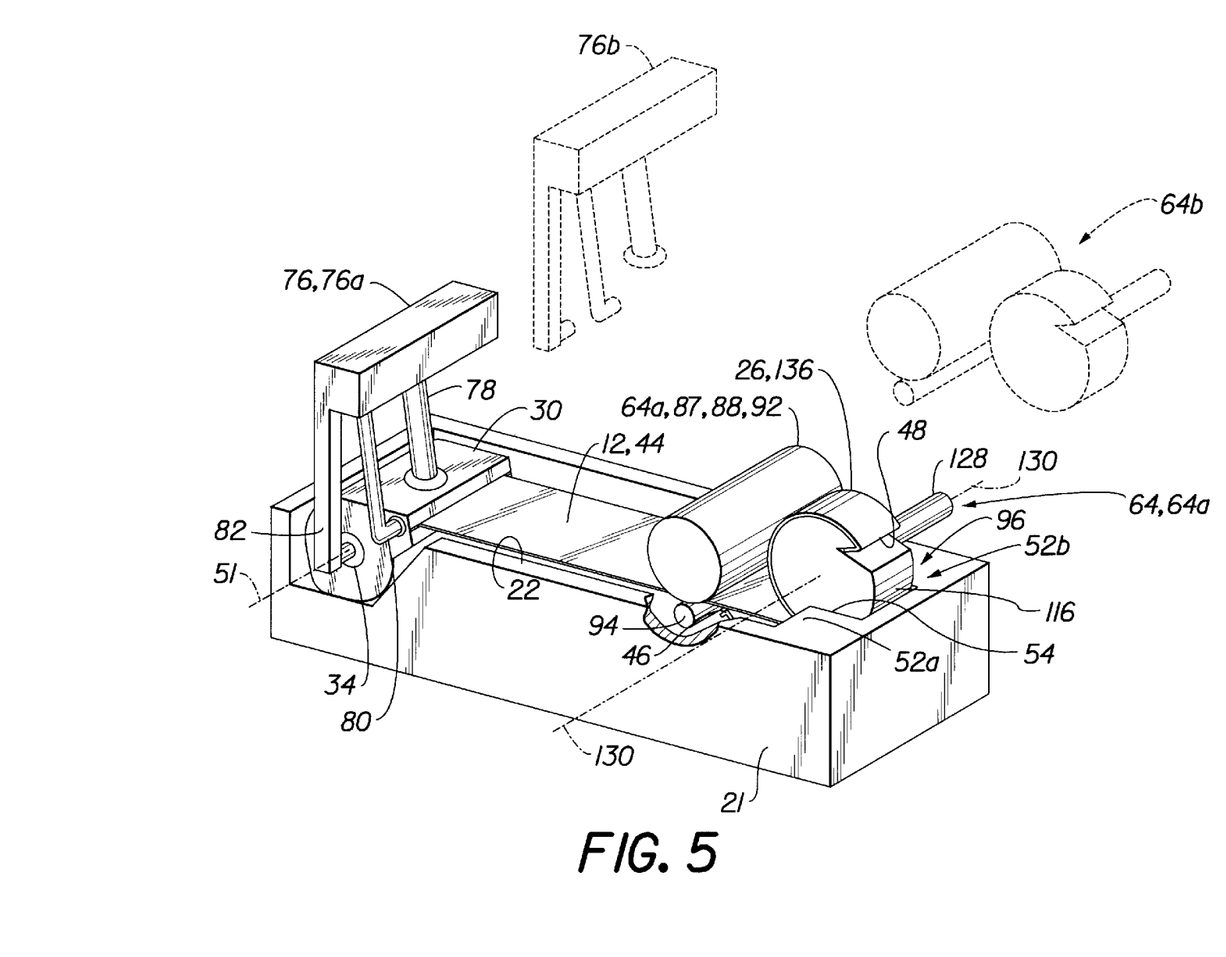
FIG. 5 is a semi-diagrammatical perspective view of still another embodiment of the apparatus and camera frame assembly of the invention. For clarity, the receiver is not shown and the bottom of the cartridge chamber has been deleted. The film bridge, cartridge mover, and sheath mover are shown in a use position in solid lines and in a non-use or rest position in dashed lines.
Figure 6:
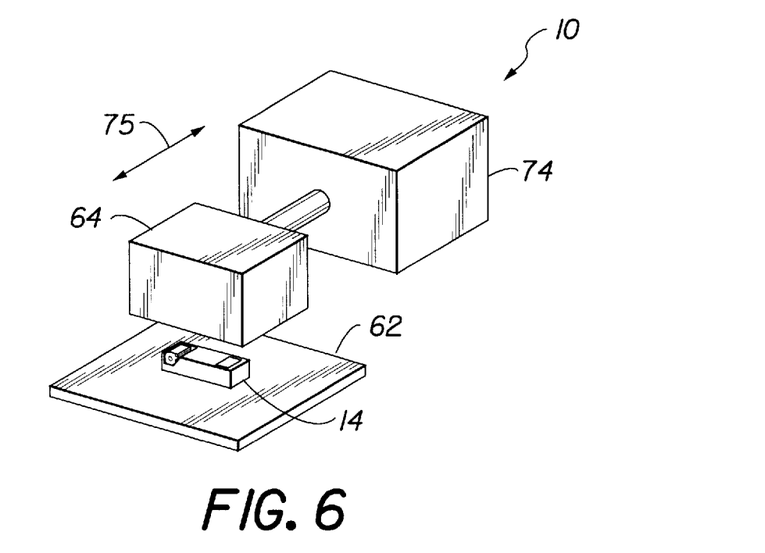
FIG. 6 is a semi-diagrammatical perspective view of another embodiment of the apparatus of the invention.
Figure 7:
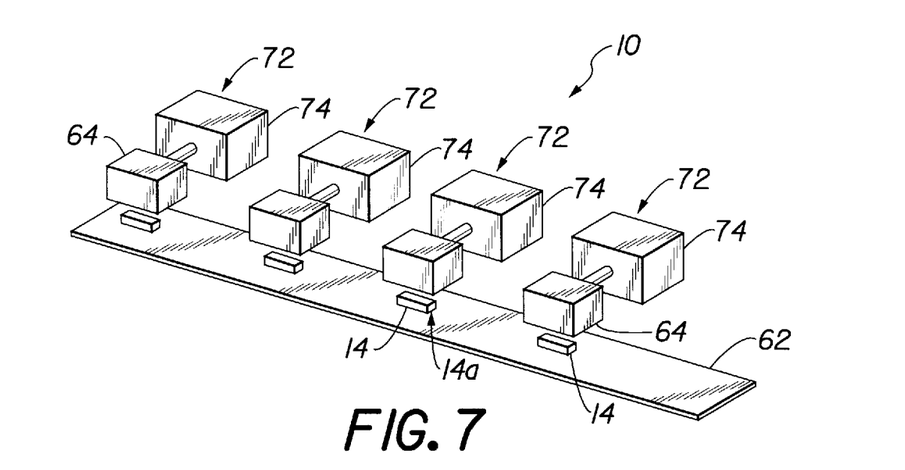
FIG. 7 is a semi-diagrammatical perspective view of still another embodiment of the apparatus of the invention.
Figure 8:
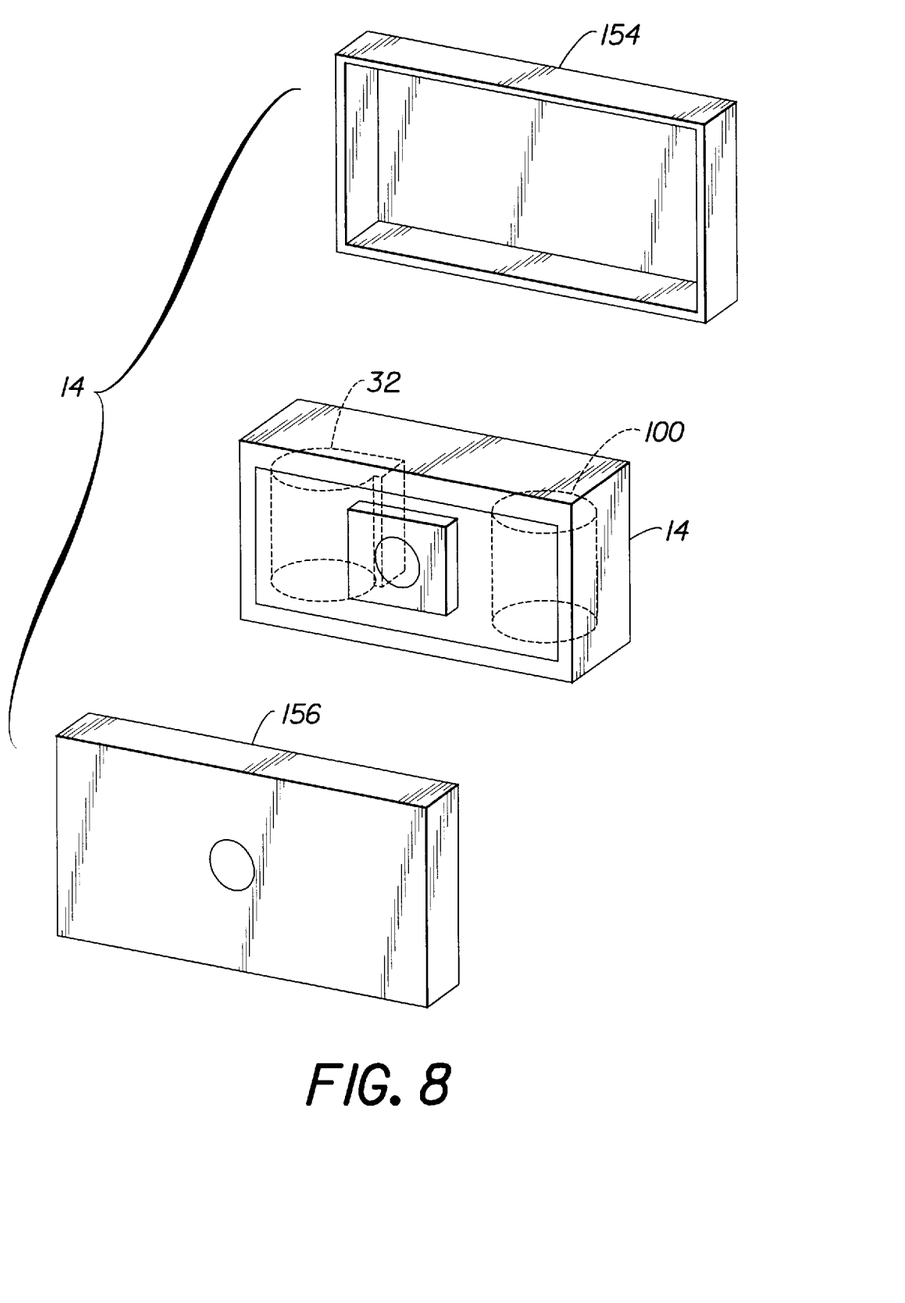
FIG. 8 is an exploded perspective view of another embodiment of the camera frame assembly of the invention.

The receiver 62 can have a variety of features for supporting automated assembly operations. For example, the receiver 62 can include a movement system or positioner 70, for moving a camera frame assembly 14 between the apparatus 10 of the invention and one or more other assembly stations or between stations 72 having different components 64 of the apparatus 10 of the invention. For example, in FIG. 1, the positioner 70 (illustrated schematically) can be a conveyor or track for moving the camera frame assembly 14 in directions perpendicular to the plane of the figure. The apparatus 10 components 64 can each include an actuation mechanism 74 such as a retraction-extension unit to allow the component 56 to extend to an active position for use and to retract to a store position clear of the movement system 70 between actuations. (Directions of movement for one component 64 are indicated in FIG. 5, by double-headed arrow 75.) The actuation mechanism 74 can also include other parts for imparting motion to component 64, such as rotary or linear drives. As a matter of convenience, the discussion herein generally treats the receiver 62 as being static relative to other components 64 of the apparatus 10 of the invention.

Referring now primarily to FIG. 5, the apparatus 10 can include a cartridge mover 76 for positioning the cartridge 30 in the cartridge chamber site. The cartridge mover 76 can be simply a pick and place mechanism or can provide additional functions. In the embodiment of the invention shown in FIG. 5, the cartridge mover 76 has a vacuum gripper 78 which allows the cartridge mover 76 to position the cartridge 30 in the site of the cartridge chamber 18. The vacuum gripper 78 or a holddown (not shown) can be used to retain the cartridge 30 in the cartridge chamber 18 during film winding, if the camera frame assembly 14 lacks features to prevent oscillation or other movement. In this embodiment, the cartridge mover 76 also supports an active light lock opener 80 and a spool rotator 82. The active light lock opener 80 pivots to open the active light lock of a suitable film cartridge 30, such as an Advanced Photo System™ (APS™) cartridge, prior to placement of the cartridge 30 in the cartridge chamber site. This allows the camera frame assembly 14 to include a detent (not shown) which retains the active light lock in the open position prior to cartridge removal for processing. The spool rotator 82 engages the spool 34 of the APS cartridge 30 and rotates the spool 34 to thrust film from the cartridge 30.

The apparatus 10 defines a film path 84 extending from the site of the cartridge chamber 18 to the site of the supply chamber 20. (In FIGS. 1–2, 4, the film path 84 is occupied by the filmstrip 12; and a film bridge 86 is disposed over the intermediate section 22 and defines parts of the film path 84.)

The apparatus 10 has a film transport 88, disposed in operative relation to the film path 84, to propel the filmstrip 12 along the film path 84 to the throat 17 of the supply chamber 20. The film transport 88 can use a driven roller, or belt, or other conventional film transport device to move the film along the film path 84. With a thrust-type film cartridge 30, a spool rotator, like that previously discussed, can also be utilized.

The use of a film bridge 86 is preferred in embodiments of the invention in which the camera film drive has a film engagement member 60, such as a conventional sprocket, that continually extends into the intermediate section 22. The film bridge 86 causes the film path 84 to be spaced apart from the intermediate section site and separates the filmstrip 12 from the engagement member 60 of the camera film drive, which thus does not need to be disabled or the like during scroll formation. In some other embodiments, the film engagement member 60, is a skater or the like and can be positioned so as to not extend into the intermediate section 22 during film winding. In these embodiments the use of a film bridge 86 is not mandatory, since film winding through the intermediate section 22 will pass freely over the film engagement member 50. A frame assembly 14 having film retention fingers can be used. Such a frame assembly is disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers define and guide the filmstrip 12 along part of the film path 84: a film entrance 89 leading into the supply chamber 20.

The film bridge 86 can take a variety of forms. The film bridge 86 can include the film transport 88, or the bridge 86 can be separate from the film transport 88, or the film transport 88 can have multiple drive elements with one or more incorporated in the film bridge 86 and one or more separate from the film bridge 86. The figures illustrate some different film transports 88 and film bridges 86.

In FIGS. 1a–1f, and 5, no film bridge 86 is used and the film transport 88 is a capstan drive 87 with the nip 90 between first and second capstan rollers 92,94 disposed at about the level of the film plane in the resulting camera. The camera frame assembly 14, in this embodiment, includes a top opening (indicated by reference numeral 96) adjacent, but exterior to the supply chamber 20. The top opening allows the lower or second capstan roller 94 to enter the frame assembly 14 and assume a use position for film transporting. The capstan rollers 92,94 rotate in the directions indicated by arrows 172,174. The lower capstan roller 94 can, alternatively, be replaced by a similar roller 94a (shown in FIG. 1f) permanently mounted in the camera frame assembly 14.

Figure 2:
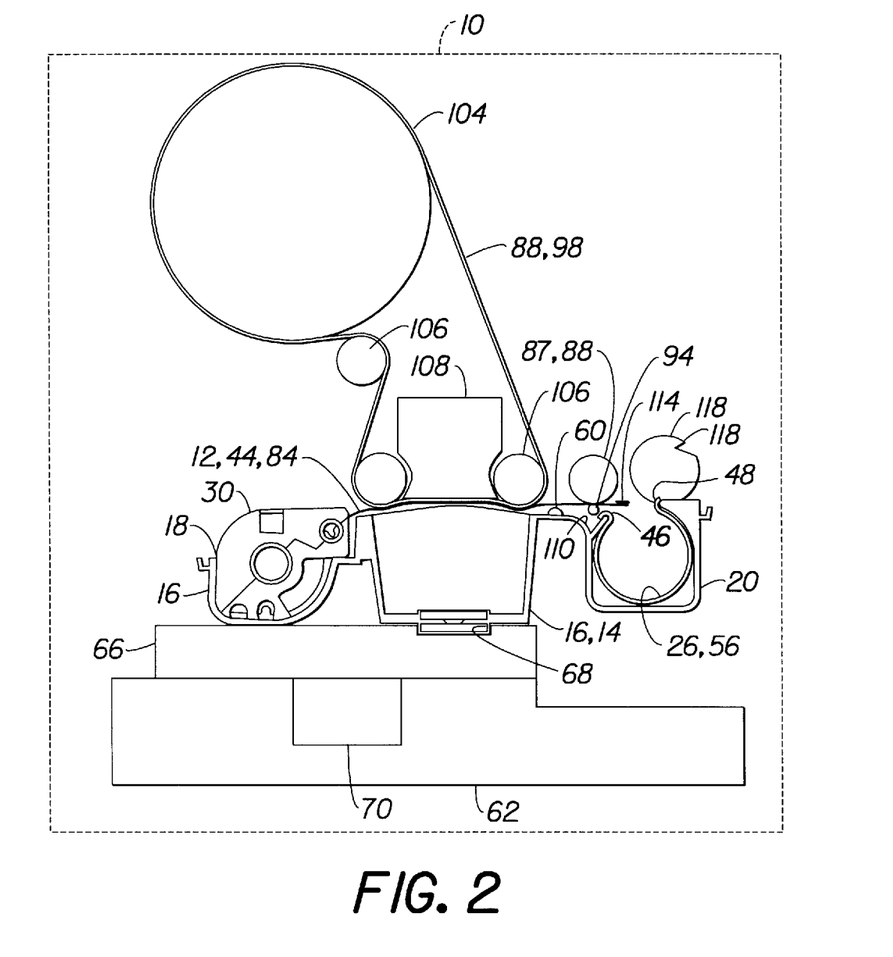
FIG. 2 is a semi-diagrammatical view of an embodiment of the apparatus of the invention, showing a receiver and film bridge. A pallet rests on the receiver. The pallet bears another embodiment of the camera frame assembly (shown in cross-section) and a cartridge.

In FIG. 2, a film bridge 86 in the form of an endless-belt mechanism is positioned over the intermediate section 22 of the camera frame assembly 14. The endless belt 98 can be disposed between the filmstrip 12 and the intermediate section 22 of the camera frame assembly 14 or, as shown in FIG. 1 can overlie the filmstrip 12. The mechanism 42 includes a belt drive 104 and idlers 106 which position and tension the belt 98. An endless belt 98 overlying the filmstrip 12 can have holes (not shown) and include a vacuum-compressed gas unit 108 which provides a vacuum to pull the filmstrip 12 against the belt 98 for transport, and directs compressed gas against the filmstrip 12, or uses gravity to release the filmstrip 12 from the belt 98. The film drive includes the belt drive of the endless-belt mechanism and a separate capstan 87 adjoining the supply chamber 20. As in FIG. 5, the capstan 87 is positioned defining a nip 90 between first and second capstan rollers 92,94 disposed at about the level of the film plane in the resulting camera. The camera frame assembly 14 has a recess or trough 110, exterior to the supply chamber 20 and below the film path 84, that receives the second capstan roller 94 during scrolling.

Figure 3:
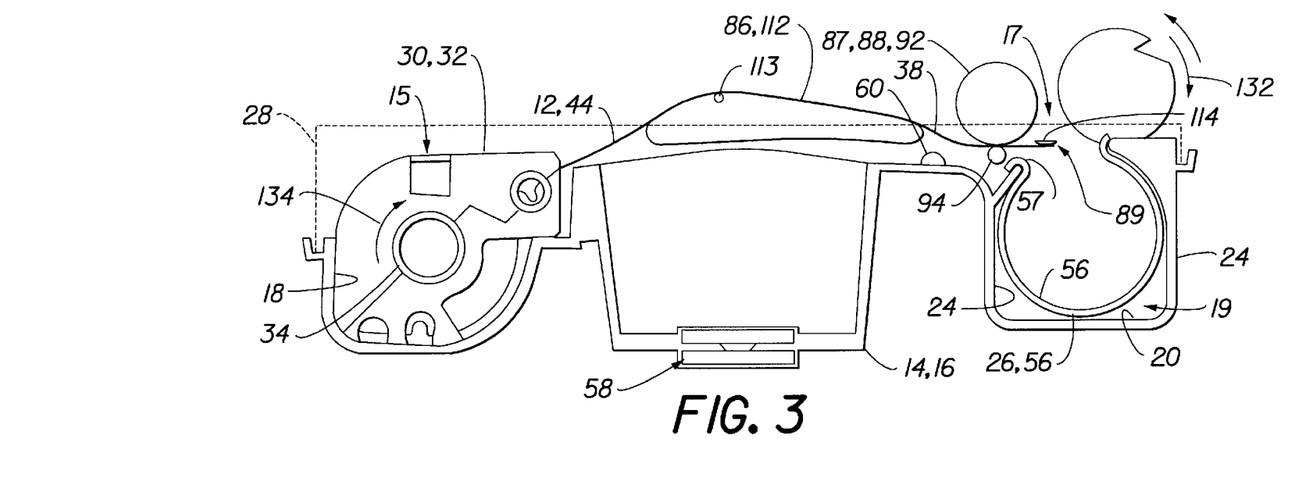
FIG. 3 is the same view of the camera frame assembly as shown in FIG. 2, but with the film bridge of an alternative embodiment of the apparatus.
Figure 4:
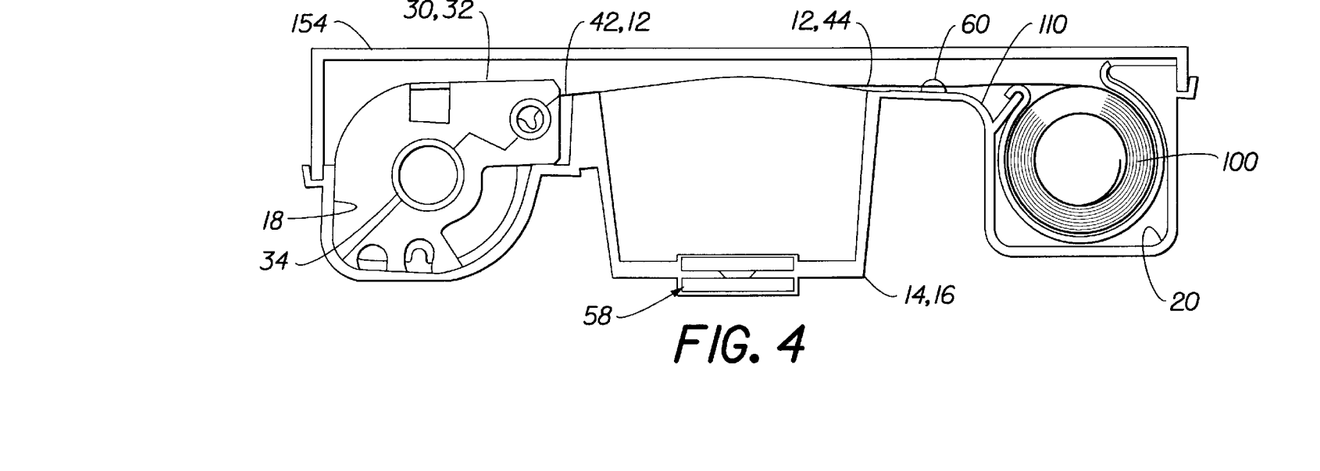
FIG. 4 is the same view of the camera frame assembly as shown in FIG. 3, after film scrolling and installation of the back cover closing the rear opening.

A similar embodiment is shown in FIG. 3, but in this case the endless belt mechanism is replaced by a turtleback 112. It is preferred that the turtleback 112 present minimal friction to the filmstrip 12. The turtleback 112 can provide one or more friction reducing features (indicated by item 113 in FIG. 2); such as holes and a pressurized gas connection to create an air cushion, or rotary bearings. Another example of a suitable film bridge 86 is a vacuum shuttle, such as that disclosed in U.S. Pat. No. 5,125,630.

The film bridge 86 can be permanently positioned relative to the receiver 62 or a positioner 70 can be provided for moving the film bridge 86 relative to the receiver 62, between a use position over the intermediate section site and a rest position spaced apart from the use position. Other components 64, such as a cartridge mover 76, can be repositioned in the same manner between active and rest positions 76a,64a and 76b,64b, respectively.

The film transport 88 can include one or more guides 114 positioned to direct the filmstrip 12 into the supply chamber 20. The guide or guides 114 are preferably centrally relieved or otherwise configured to eliminate or minimize contact with the image area of the filmstrip 12.

The apparatus 10 includes a sheath mover 116 that is disposable over the receiver 62. The sheath mover 116 advances the sheath 26 into the supply chamber 20 during scrolling.

The main section 56 of the sheath 26 can be initially installed in the supply chamber 20 during scrolling. In this case, the action of the sheath mover 116 can be limited to feeding the sheath 26 into the supply chamber 20. The first end 46 of the sheath 26 can be attached to the first projection 50 in a separate procedure. Appropriate mechanisms for these purposes, can be as simple or complex as desired to meet associated requirements such as cost and speed, and the first end 46 could be attached and the sheath 26 advanced manually if desired.

In currently preferred embodiments of the invention, the sheath mover 116 engages the second end 48 of a sheath 26 previously installed in the film supply, partially withdraws the main section 56 of the sheath 26 and then advances the sheath 26 back into the supply chamber 20 during film scrolling. The main section 56 of the sheath 26 can be installed in the supply chamber 20 and the ends 46,48 attached to respective projections 50,52 immediately before the sheath mover 116 grabs the second end 48 of the sheath 26 or at some earlier time. For example, the sheath 26 can have been installed before usage and recycling of a camera frame assembly 14. The exposed film is, of course, removed for processing prior to recycling the camera frame assembly 14 for reuse.

The sheath mover 116 engages the sheath 26 with a sheath grabber 118. The sheath grabber 118 is adapted to engage the second end 48 of the sheath 26. The manner in which the sheath grabber 118 engages the second end 48 must be appropriate for a particular type of second end 48, but is otherwise not critical. For example, the sheath grabber 118 can be a vacuum gripper, a pair of opposed jaws, a hook matching an eye on the sheath 26, an eye matching a hook on the sheath 26, or other mechanical element. The sheath grabber 118 can use temporary adhesive or the like, such as melted hot-melt glue; but these and other non-mechanical engagements are not preferred at this time.

Before the sheath grabber 118 engages the second end 48, the sheath 26 defines and generally borders a substantially cylindrical final scroll space 102. (As the terminology suggests the final scroll space 102 begins and ends after film scrolling with about the same dimensions.) After the sheath 26 has been maximally withdrawn by the sheath mover 116, a remaining or inside part 120 of the main section 56 of the sheath 26 is in the supply chamber 20 and defines and generally borders an initial scroll space 102a. During withdrawal, and during sheath advancing (discussed below), the remaining part 120 of the sheath 26 in the supply chamber 20 defines a continuous sequence of intermediate scroll spaces 102b. The volume of the scroll spaces increase from initial scroll space 102a to the intermediate scroll spaces 102b in sequence and then to the final scroll space 102. It is preferred that the initial scroll space 102a, final scroll space 102, and intermediate scroll spaces 102b are all substantially cylindrical. In other words, it is preferred that the remaining part 120 of the sheath 26 within the supply chamber 20 during scrolling always have the approximate configuration of an arcuate portion of a hollow circular cylinder, rather than, for example being hyperbolic in cross-section or kinked. This helps prevent deformation of the film scroll during formation and resulting scuffing or other film damage.

Substantially cylindrical initial and intermediate scroll spaces can be provided during sheath advancement or; as a matter of convenience, during both sheath advancement and sheath withdrawal; by constraining the remaining part 120 of the main section 56 of the sheath 26 into a curve or loop and bowing or bending an outer or extracted part 136 of the main section 56 outward relative to the remaining part 120. The outer part 136 can have a curved or straight shape. It is preferred that the remaining part 120 of the sheath 26 be uniformly curved throughout and that the juncture 121 between the remaining part 120 and the outer part 136 bear against a support. This reduces the risk of the sheath 26 oscillating during film scrolling. In the embodiment of the invention shown in FIGS. 1a–1f, the sheath 26 is bent into a sinusoid having two lobes, one defining the scroll space and the other outside the supply chamber 20. The term "sinusoidal" and similar terms are used in reference to items that have a cross-sectional shape resembling the letter "S", or the numeral "8", or the like. In the embodiment of the invention shown in FIGS. 9a–9f, the main section 56 is bent into a hook shape with the bell of the hook defining the scroll space and a straight or slightly bent shank to the outside of the supply chamber 20.

Referring now particularly to the embodiment of the invention shown in FIGS. 1a–1f, the sheath mover 116 has the shape of a short cylinder with a notched circumference. The empty notch 122 in the circumference has a uniform cross-section along the length or axial dimension of the cylinder. The notch cross-section is roughly triangular with two sides extending along intersecting chords of the circular cylinder cross-section. The third side is an opening generally aligned with the circumference of the circular cylinder cross-section. One side of the notch 122, in the embodiment shown in the figures the shortest side, provides one engagement surface 124 of the sheath grabber or tooth 118 defined by the notch 122 and remaining circumference of the cylindrical sheath mover 116. The other engagement surface 126 of the tooth is a portion of the circumference of the sheath mover 116.

The sheath mover 116 is joined to a drive 128 for rotation about the axis of the sheath mover 116. The drive 128 can be a servomotor or stepper motor or gear train or the like, which can accurate pivot the sheath mover 116 during scroll 100 formation. Referring still to the embodiment shown in the figures, in a use position, the sheath mover 116 is disposed at the throat 17 of the supply chamber 20 and extends down through the slot 54 between the two sub-projections 52a,52b of the second projection 52. The sheath mover axis 130 is parallel to the axis of the cartridge spool 34.

In the embodiment of the method of the invention shown in the figures, a film cartridge 30 is first gripped and placed in the cartridge chamber 18 of the camera frame assembly 14. The cartridge mover 76 can simply place a film cartridge 30 in the cartridge chamber 18 or can pick up a cartridge 30 from a supply (not shown), move the cartridge 30 to the cartridge chamber 18, and then continue to grip or otherwise retain the cartridge 30 in position until film winding is completed. This is convenient if the camera frame assembly 14 lacks features to prevent oscillation or other movement of the film cartridge 30 during film winding. An active light lock opener 80 can be pivoted to open the active light lock of a suitable film cartridge 30, such as an Advanced Photo System™ (APS™) cartridge, prior to placement of the cartridge 30 in the cartridge chamber site. This allows the camera frame assembly 14 to include a detent (not shown) which retains the active light lock in the open position during film use.

The sheath mover 116 is lowered into the slot 54. The sheath mover 116 axis remains exterior to the supply chamber 20. Both sheath ends 46,48 are attached to respective projections 50,52. The sheath mover 116 is in a first orientation or, if necessary, is rotated about the sheath mover axis 130 relative to the camera frame assembly 14 into the that orientation. In the first orientation, the sheath grabber 118 is displaced outward from the second end 48 of the sheath 26 and the second projection 52. The absolute position of the sheath grabber 118 in the first orientation is not critical. An exemplary first orientation is illustrated in FIG. 1a.

Referring now to FIGS. 1a and 3, the sheath mover 116 is then rotated in the direction indicated by arrow 132. This is the same direction of rotation that the cartridge 30 spool 34 takes during film transport 88, indicated by arrow 134. The rotation of the sheath mover 116 is continued until the sheath grabber 118 assumes a second orientation (not illustrated) in which the sheath grabber 118 is interposed in the slot 54 and the engagement surfaces 124,126 engage the second end 48 of the sheath 26. Rotation of the sheath mover 116 is continued with the sheath grabber 118 engaging the second end 48 of the sheath 26. The second end 48 unhooks from the second projection 52 and is displaced outward from the second projection 52 and the main section 56 of the sheath 26 begins to be withdrawn from the supply chamber 20. The outer part 136 of the main section 56 of the sheath 26 wraps around a roller surface 138 of the sheath mover 116 as the outer part 136 is withdrawn. The main section 56 of the sheath 26 assumes the shape of a gradually altering sinusoid, with the juncture 121 between remaining and outer parts 120,136 of the sheath continuously supported by the roller surface. In the embodiment shown in the figures, the sheath mover 116 has a maximum diameter at the roller surface 138, that is about the same size as the diameter of the initial scroll space 102a. This size sheath mover 116 is convenient, because it easily fits within the slot 54 without occupying an excessive portion of the throat 17.

Rotation of the sheath mover 116 continues until the sheath mover 116 assumes a third orientation shown in FIG.

1b, at which time the rotation of the sheath mover 116 is stopped. In the third orientation, the remaining part 120 of the sheath 26 in the supply chamber 20 has reached a size that defines the initial film space 102a. The size of the initial film space 102a can be adjusted by controlling the degree of rotation of the sheath mover 116. A larger initial scroll space 102a can be used with a shorter filmstrip 12 to provide the same outer diameter final scroll 100 after completion of scrolling and minimizing clockspringing at the completion of scrolling, reducing the risk of film damage due to scuffing and the like. A control unit (not illustrated) can be used to control the cutting of filmstrips to desired lengths in tandem with adjusting the size of the initial scroll space for specific length filmstrips.

The filmstrip 12 is initially propelled to the supply chamber 20 before, during, or after withdrawal of the outer part 136 of the sheath 26. It is desirable that the free end 40 of the filmstrip 12 be spaced apart from the sheath 26 during withdrawal to avoid possible damage to the sheath 26 and filmstrip 12 and to avoid the risk of misguiding of the filmstrip 12 out of the supply chamber 20. The filmstrip 12 is advanced by the film transport 88 from the cartridge 30 along the film path 84, and the free end 40 of the filmstrip 12 enters the supply chamber 20. The manner in which the film transport propels the filmstrip varies with the film type and the characteristics of the camera frame assembly. With a thrust type film cartridge, such as an APS cartridge, the spool rotator 82 engages the spool 34 of the cartridge 30 and rotates the spool 34 to thrust the filmstrip 12 from the cartridge 30. The film transport 88 can be limited to the spool rotator or can include another mechanism, such as a capstan, that takes over for or operates with the spool rotator 82. Depending upon the film drive of the camera frame assembly 14, as discussed above, a film bridge 86 can be positioned over the intermediate section 22 of the frame 16. A detector (not shown) can be positioned to sense optically or in some other manner when the free end 40 reaches the supply chamber 20.

Referring now to FIG. 1c, the main portion 44 of the filmstrip 12 is next propelled into the initial scroll space. As the filmstrip 12 is propelled, the outer part 136 of the main section 56 of the sheath 26 is advanced back into the supply chamber 20 by rotation of the sheath mover 116 in the direction indicated by arrow 117. It is highly desirable that the rate of sheath advance be coordinated with the propelling of the filmstrip 12. Although the sheath mover 116 tensions the sheath 26 and as a result a compressive force is applied against the outermost turn of film scroll during and after scroll formation; it is not desirable that the sheath 26 force contracture of the turns of filmstrip 12 during scrolling. Such contracting of the scroll would be likely to cause scuffing or other film damage. It is preferred that the scroll space increases in size to accommodate the accumulating turns of film scroll as the additional space is needed. In other words, it is preferred that the sheath 26 be advanced into the supply chamber 20 at a rate that matches or slightly exceeds the rate of increase in outer diameter of the film scroll. This can be conveniently provided by maintaining a constant torque on drive 128.

Referring now to FIGS. 1d–1e, the propelling of the filmstrip 12 continues and the film scroll 100b and scroll space 102b grow in size. Friction reduction can be provided on the film path 84. For example, air can be blown through holes in the vacuum/air belt 98 of a film bridge 86 to provide an air cushion. Scrolling is continued until the main portion 44 of the filmstrip 12 has been wound over the initial film scroll 100a, forming the fully wound, final film scroll 100.

The remaining or trailing portion 42 of the filmstrip 12 remains attached to the spool 34 in the film cartridge 30 and after winding extends across the intermediate portion 22 to the final film scroll 100. Film transport 88 is stopped before an excessive strain is placed on the trailing portion 42. This may be done in a variety of ways. For example, a sensor (not shown) can detect an increased load on the film transport 88 due to reaching the trailing portion 42; or count rotation of the film spool 34 or another rotating part; or track the length or area of filmstrip 12 traveling to the film roll; or film can be wound for a predetermined time. With any of these approaches a slip clutch (not shown) can be provided in the film transport 88 to accommodate excessive strain.

The embodiment of the invention shown in FIGS. 9a–9f operates in a manner similar to that just described, except that the movements of the sheath mover 116a are linear rather than rotation. The upper portion of the sheath mover 116 is not shown, but is connected to a linear actuator or other similar mechanism for movement in the directions indicated by arrows 140,142. As with other embodiments of the invention, it is highly desirable that sheath and filmstrip movements be controlled by automated mechanisms, since this allows coordination, high speeds, and good control of movements; however, the method of the invention can be performed with manual control of sheath and film movements.

Figure 9A:
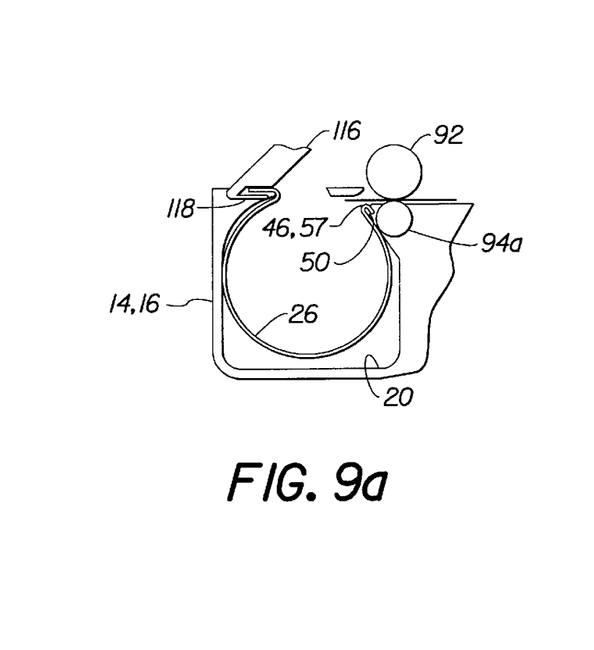
FIGS. 9a–9f are semi-diagrammatical partial views of still another embodiment of the advancing sheath film loader and still another embodiment of the camera frame assembly of the invention at different stages in the method of the invention.
Figure 9B:
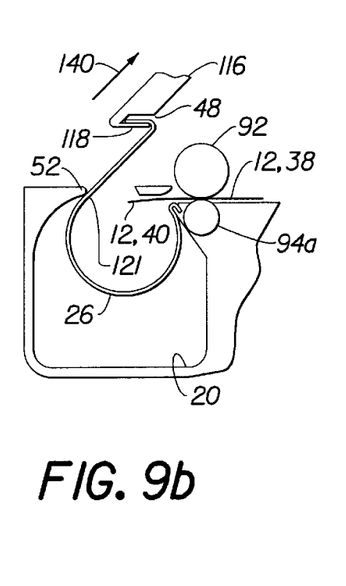
Figure 9C:
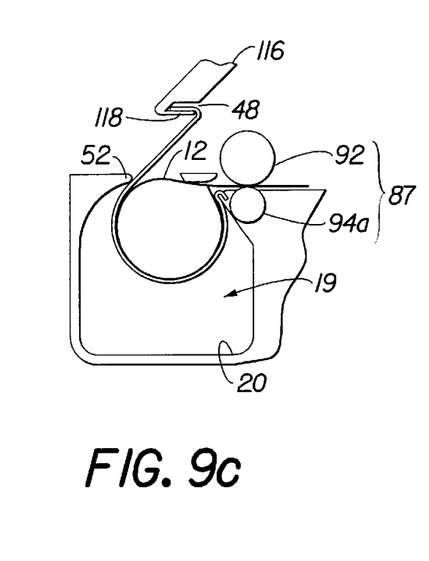
Figure 9D:
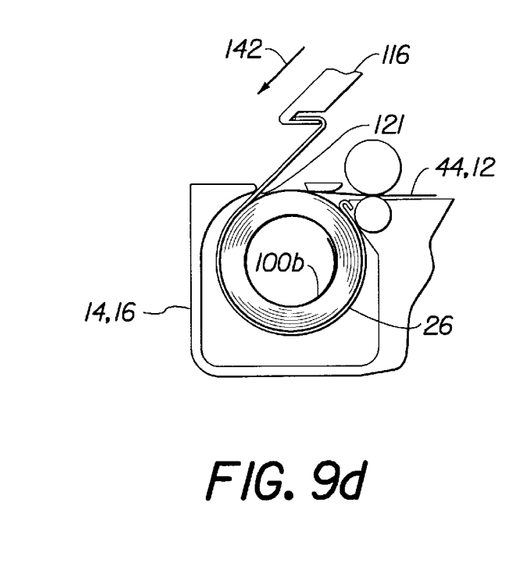
Figure 9E:
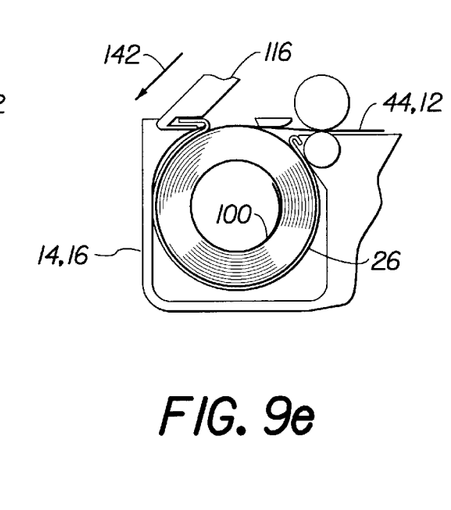
Figure 9F:
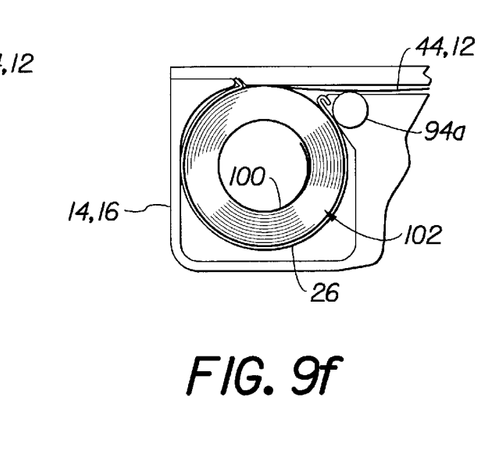

Referring now to the embodiments of both FIGS. 1a–1f, 5, and 9a–9f, when the main portion 44 of the filmstrip 12 finishes scrolling, the sheath grabber 118 reenters the slot 54 between the subprojections 50,52 of the second projection 52. The second end 48 of the sheath 26 rehooks on the second projection 52. The rotation or linear movement of the sheath mover 116 continues until the sheath mover 116 again assumes the first orientation, as shown in FIGS. 1e and 9e. At this time, the sheath mover 116 and other apparatus components such as the upper capstan roller 92, shown in FIGS. 1a–1e and 9a–9e, can be moved to a non-use position, relative to the camera frame assembly 14, which is then moved along for further processing. In embodiments of the invention having a film bridge 86, the camera frame assembly 14 is first displaced relative to the film bridge 86, and slack in the filmstrip 12 is taken up by retracting that filmstrip 12 portion back into the cartridge 30 or driving that filmstrip 12 portion forward with a driven roller (not shown) or the like.

The sheath mover 116 can be mounted so as to move between a use position and a rest position in the same manner as the film bridge 86 and cartridge mover 76, either with the other component 64 or independently. Suitable drives, linear actuators and the like for movement of the component 64 are well known to those of skill in the art. The sheath 26 can be recessed or fully or partially divided to provide two subunits or bands (not separately illustrated) positioned to contact only the margins of the filmstrip 12. This would reduce the risk of damage to the image area of the filmstrip 12. The guide and film transport 88 can be relieved or cut-away in the same manner.

After the film transport 88 and sheath mover 116 are moved away from the camera frame assembly 14, the rear opening 28 of the camera frame assembly 14 is light-tightly closed. Referring now to FIG. 14, in a particular embodiment of the invention, this is accomplished by placing a light-tight rear cover 154 over the chambers 18,20 and intermediate section 22 and a light-tight front cover 156 over the camera frame assembly 14. The resulting camera assembly can be a completed camera or can be completed in other assembly operations. In addition to the features already discussed, including a film cartridge 30 and film scroll 100, the camera can also include other conventional camera features well known to those of skill in the art.

The invention has been described in detail with particular reference to certain preferred embodiments thereof, but it will be understood that variations and modifications can be effected within the spirit and scope of the invention.

PARTS LIST advancing sheath film loader 10
filmstrip 12
frame assembly 14
throat 15
frame 16
throat 17
cartridge chamber 18
supply space 19
supply chamber 20
end walls 21
intermediate section 22
sidewall 24
sheath 26
rear opening 28
cartridge 30
canister 32
spool 34
leading portion 38
free end 40
trailing portion 42
main portion 44
first end 46
second end 48
first projection 50
axis 51 (of film cartridge spool)
second projection 52
sub-projections 52*a*,52*b*
slot 54
channel 55
main section 56
bell 57
exposure system 58
edge 59
film engagement member 60
lower leg 61
receiver 62
component 64
active and rest positions 64*a* and 64*b*
pallet or nest 66
Indexing features 68
movement system or positioner 70
stations 72
actuation mechanism 74
double-headed arrow 75
cartridge mover 76
active and rest positions 76*a*, 76*b*
vacuum gripper 78
active light lock opener 80
spool rotator 82
film path 84
film bridge 86
capstan 87
film transport 88
film entrance 89
nip 90
first and second capstan rollers 92,94
roller 94*a*
arrow 96
endless belt 98
final film scroll 100
initial film scroll 100*a*
intermediate film scroll 100*b*
final scroll space 102
initial scroll space 102*a*
intermediate scroll spaces 102*b*
belt drive 104
idlers 106
vacuum-compressed gas unit 108
recess or trough 110
turtleback 112
friction reducing features 113
guide 114
sheath mover 116
arrow 117
sheath grabber 118
remaining part 120
juncture 121
notch 122
engagement surface 124
engagement surface 126
drive 128
sheath mover axis 130
arrow 132
arrow 134
outer part 136
roller surface 138
arrows 140,142.
rear cover 154
front cover 156

What is claimed is:

1. A method for loading a photographic filmstrip in a film supply, said method comprising the steps of:

advancing a sheath into the film supply, said sheath defining a substantially cylindrical scroll space within the film supply;

during said advancing, propelling said filmstrip into said scroll space to form a scroll; and during said propelling, tensioning said sheath against said scroll.

2. The method of claim 1 further comprising, during said advancing, bending said sheath.

3. The method of claim 1 wherein the film supply is a supply chamber of a camera body and said method further comprises, following said propelling, light-tightly closing said camera body.

4. The method of claim 1 wherein said tensioning further comprises applying a substantially uniform or decreasing compressive force against said scroll during said propelling.

5. The method of claim 1 further comprising attaching a first end of said sheath to the film supply prior to said advancing and attaching a second end of said sheath to the film supply after said advancing.

6. The method of claim 1 further comprising, prior to said advancing, installing said sheath substantially within the film supply and partially extracting said sheath from the film supply.

7. The method of claim 6 wherein said partially extracting further comprises winding an outer part of said sheath about an axis exterior to the film supply.

8. The method of claim 6 wherein said partially extracting further comprises moving an outer part of said sheath linearly.

9. The method of claim 1 further comprising, prior to said advancing, installing a main portion of a sheath substantially within the film supply; attaching a first end of said sheath to the film supply; catching a second end of said sheath; and partially extracting said sheath from the film supply.

10. The method of claim 9 further comprising: prior to said catching, hooking said second end of said sheath onto the film supply; and following said advancing, rehooking said second end of said sheath onto the film supply.

11. The method of claim 10 wherein said attaching further comprises hooking said first end of said sheath onto the film supply.

12. A method for loading a photographic filmstrip into a sheath connected to a supply chamber of a camera body, said method comprising the steps of:

catching an end of said sheath;

partially extracting said sheath from the supply chamber;

advancing said sheath into the supply chamber, said sheath defining a substantially cylindrical scroll space within the supply chamber;

during said advancing, propelling said filmstrip into said scroll space to form a scroll;

during said propelling, tensioning said sheath against said scroll; and reattaching said end of said sheath to said supply chamber.

13. The method of claim 12 further characterized as:

hooking first and second ends of said sheath onto the film supply;

catching said second end of said sheath;

partially extracting said sheath from the supply chamber;

advancing said sheath into the supply chamber, said sheath defining a substantially cylindrical scroll space within the supply chamber;

during said advancing, propelling said filmstrip into said scroll space to form a scroll;

during said propelling, tensioning said sheath against said scroll; and following said advancing, rehooking said second end of said sheath onto the film supply.

14. The method of claim 12 further comprising prior to said catching, removing exposed film from said camera body.

15. Apparatus for loading a photographic filmstrip in a film supply, said film supply having first and second opposed projections defining a throat, said film supply having a flexible sheath, said sheath having opposed first and second ends attached to respective said projections, said apparatus comprising:

a receiver supporting said film supply;

a film transport disposable over said receiver, said film transport propelling said filmstrip into said throat; and a sheath mover partially extracting said sheath from said film supply and returning said sheath into said film supply in coordination with said propelling of said filmstrip.

16. The apparatus of claim 15 wherein said sheath mover includes a sheath grabber, said sheath grabber being disposable over said receiver, said sheath grabber being movable from a first orientation wherein said sheath grabber is displaced outward from said first projection, to a second orientation wherein said sheath grabber engages said first end of said sheath and adjoins said first projection, and from said second orientation to a third orientation wherein said sheath grabber engages said first end of said sheath and is displaced outward from said first projection, said sheath grabber being returnable from said third orientation to said first orientation in coordination with said propelling of said filmstrip.

17. The apparatus of claim 16 wherein said sheath grabber is rotatable between said orientations about an axis exterior to said film supply.

18. The apparatus of claim 17 wherein said sheath grabber further comprises at least one engagement surface and a semi-cylindrical roller surface adjoining said engagement surface, said roller surface bearing against said sheath when said sheath grabber is in said third orientation.

19. The apparatus of claim 16 wherein said sheath grabber is movable linearly between said orientations, exterior to said film supply.

20. A camera comprising:

a body having a cartridge chamber, a supply chamber, and an exposure frame between said chambers, said supply chamber having first and second opposed projections defining a throat;

a flexible sheath, said sheath having opposed first and second ends attached to respective said projections, said sheath defining a substantially cylindrical film space within said supply chamber.

21. The camera of claim 20 wherein said second end is hooked on said second projection.

22. The camera of claim 20 further comprising a film scroll disposed in said film space, said sheath having an elastic modulus greater than the elastic modulus of said film.

23. The camera of claim 20 wherein said supply chamber has an interior wall and a pair of opposed end walls, said projections and said walls all being parts of a unitary plastic casting.

* * * * *